United States Patent [19]

Fukuda et al.

[11] Patent Number: 4,797,242
[45] Date of Patent: Jan. 10, 1989

[54] METHOD FOR SHAPING THERMOSETTING RESINS

[75] Inventors: Yoshiaki Fukuda; Takeshi Miyasaka; Iori Matsumoto; Nobukatsu Kato; Kenji Ema, all of Kanagawa, Japan

[73] Assignee: Mitsui Toatsu Chemicals, Incorporated, Tokyo, Japan

[21] Appl. No.: 40,323

[22] Filed: Dec. 23, 1986

Related U.S. Application Data

[63] Continuation of Ser. No. 594,663, Mar. 29, 1984, abandoned.

[30] Foreign Application Priority Data

Mar. 29, 1983 [JP] Japan ................................ 58-51526
Jun. 14, 1983 [JP] Japan ............................... 58-104891
Oct. 27, 1983 [JP] Japan ............................... 58-200038
Oct. 27, 1983 [JP] Japan ............................... 58-200040
Nov. 2, 1983 [JP] Japan ............................... 58-204965
Nov. 2, 1983 [JP] Japan ............................... 58-204966
Nov. 8, 1983 [JP] Japan ............................... 58-208298

[51] Int. Cl.⁴ ............................................ B29C 47/78
[52] U.S. Cl. ................................ 264/108; 264/209.2; 264/209.6; 264/211.24; 264/236; 264/349; 425/207; 425/379.1; 425/382.3
[58] Field of Search ..................... 264/108, 349, 209.6, 264/236, 174, 211.21-211.24, 68, 209.2; 425/208, 209, 205-207, 376 B, 378, 9 R, 382.3, 378.1, 379.1

[56] References Cited

U.S. PATENT DOCUMENTS 1,800,180  4/1931  Day ................... 264/211.21
2,541,201  2/1951  Buecken et al. ........... 264/349 X
2,808,623  10/1957 Foster ....................... 264/22
2,902,923  9/1959  Stacy ................... 425/381 X
3,069,727  12/1962 Shramek ..................... 425/97
3,121,914  2/1964  Olson et al. ............ 264/349 X
3,979,488  9/1976  Greenhalgh et al. .......... 425/113
3,981,653  9/1976  Greenhalgh et al. .......... 425/113
4,001,368  1/1977  Michizoe et al. ............ 264/236
4,111,621  9/1978  Otani ....................... 425/113
4,365,946  12/1982 Anders ..................... 425/206
4,459,250  7/1984  Miura et al. .............. 425/174.6

FOREIGN PATENT DOCUMENTS 2754877    2/1979  Fed. Rep. of Germany ...... 264/174
46-22595   6/1971  Japan ..................... 425/144
47-18437   5/1972  Japan ..................... 264/236
53-19029   6/1978  Japan ..................... 264/236
54-31488   3/1979  Japan ..................... 264/349
146860     11/1979 Japan .
128521     8/1982  Japan .

Primary Examiner—Jeffery Thurlow
Attorney, Agent, or Firm—Sughrue, Mion, Zinn, Macpeak & Seas

[57] ABSTRACT

A method for molding a thermosetting resin pipe having a balanced compressive strength between the axial direction and the direction normal to the pipe axis is disclosed. The method includes steps of molding a thermosetting resin in a smooth zone in the front section of a screw to such an extent that the resin after being extruded from the cylinder is capable of retaining its own shape, and orienting the resin and/or a fibrous filler randomly. An apparatus for producing such a thermosetting resin, and a thermosetting resin having a balanced compressive strength are also disclosed.

8 Claims, 6 Drawing Sheets

→ DIRECTION OF EXTRUSION

DIRECTION OF EXTRUSION 4,797,242

METHOD FOR SHAPING THERMOSETTING RESINS

This is a continuation of application Ser. No. 594,663, filed Mar. 29, 1984, abandoned.

BACKGROUND OF THE INVENTION

The present invention relates to an improved method and apparatus for extrusion molding of thermosetting resins.

Methods available for molding thermosetting resins are compression molding, transfer molding, injection molding and extrusion molding. For extruding simple long profiles such as round bars and pipes, plunger type molding equipment is commonly employed. However, plunger machines have a low productivity and involve difficulty in producing extrudates of consistent quality because they provide high extrusion pressure in the mold cavity and can achieve only intermittent extrusion cycles. In order to eliminate these defects, extrusion molding using screw-type equipment has been developed. According to this method, a melt of thermosetting resin in the screw machine is introduced through an adapter into the mold where it is given the final profile. However, it is still impossibly difficult to achieve continuous and consistent molding by this method. As shown in Japanese Patent Application (OPI) No. 146860/79, the screw-type equipment has complex resin channels. Thus, slight fluctuation in temperature or pressure cause a rapid progress of the thermosetting reaction or stagnation of the melt can occur, which causes a localized setting reaction. Therefore, much effort has been made to solve these problems with the screw-type extrusion machines.

Japanese Patent Application (OPI) No. 128521/82 shows a screw-type machine for the extrusion of cross-linked polyethylene. In order to prevent deterioration of the weld strength due to torpedo fins, a torpedo whose outside diameter is 3/10 to 4/10 of the screw diameter and which penetrates through the screw is coupled to the drive mechanism of the extruder and is rotated for orienting the resin feed. However, even this screw type machine does not suggest continuous extrusion molding equipment suitable for the molding of thermosetting resins because the machine involves structural limitations on the outside diameter of the torpedo, namely, the inside diameter of a designable resins pipe.

SUMMARY OF THE INVENTION

Therefore, an object of the present invention is to provide an extrusion method for performing a consistent thermosetting reaction of, or molding of, a thermosetting resin.

Another object of the present invention is to provide a method for extruding a thermosetting resin into a pipe having a random orientation as a whole, and thereby ensuring balanced compressive strength between the axial direction and the direction normal to the pipe axis.

A further object of the present invention is to provide a continuous extrusion molding machine capable of attaining these objects.

Still another object of the present invention is to provide a thermosetting resin pipe suitable for use as an electrical, construction or civil engineering material.

The method of the present invention is characterized by molding a thermosetting resin in a smooth zone in the front section of a screw to such an extent that the resin, after being extruded from the cylinder, is capable of retaining its own shape. According to this method, the resin and/or a fibrous filler is oriented randomly so that a molded thermosetting resin, especially in a pipe form having a balanced compressive strength between the axial and diametric directions, is obtained with consistent results. The present invention also provides an apparatus for producing such molded articles, as well as uses thereof.

DETAILED DESCRIPTION OF THE PREFERRED EMBODIMENTS

In the method of the present invention, a thermosetting resin is subjected to promoted thermosetting reaction, namely molding in a smooth zone in the front section of a screw to such an extent that the resin after being extruded from the cylinder is capable of retaining its own shape.

According to the method of the present invention, the molecules of the thermosetting resin and the filaments of a fibrous filler (if one is incorporated in the resin) are oriented in such a manner that the resulting molded article is oriented randomly as a whole, thereby providing a molded article having a good balance in strength, for example, compressive strength, between the direction of extrusion and the direction normal to the direction, which article has improved utility as an electrical construction or civil engineering material.

Figure 1:
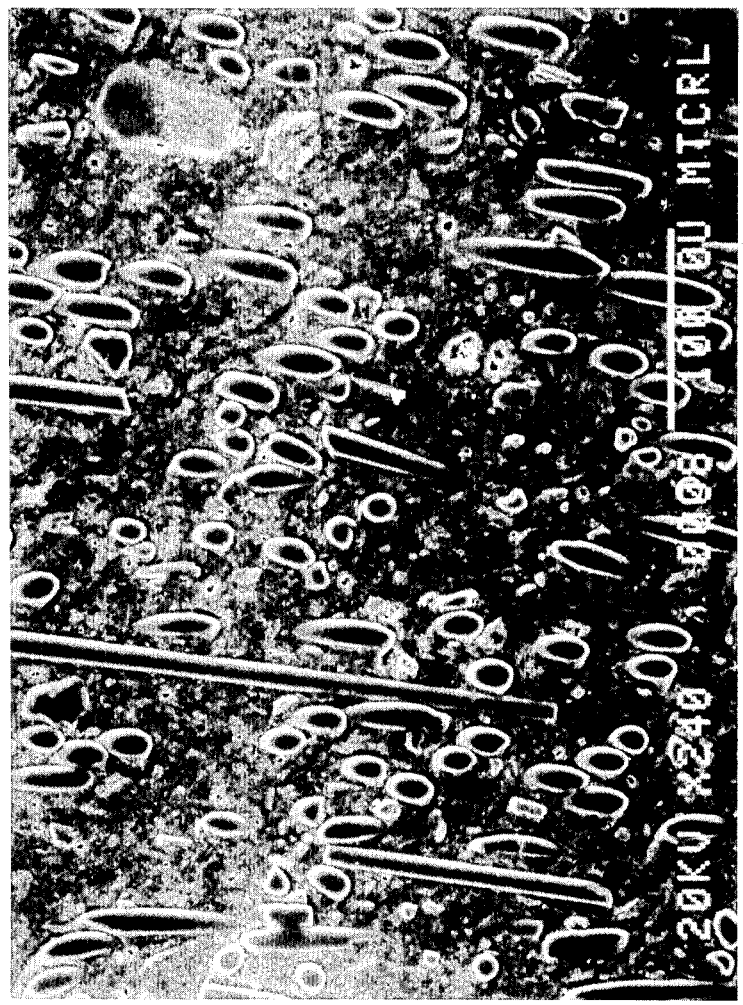
FIGS. 1 and 2 are electron micrographs showing in longitudinal and transversal sections a phenolic resin pipe produced by a conventional extrusion molding method.
Figure 2:
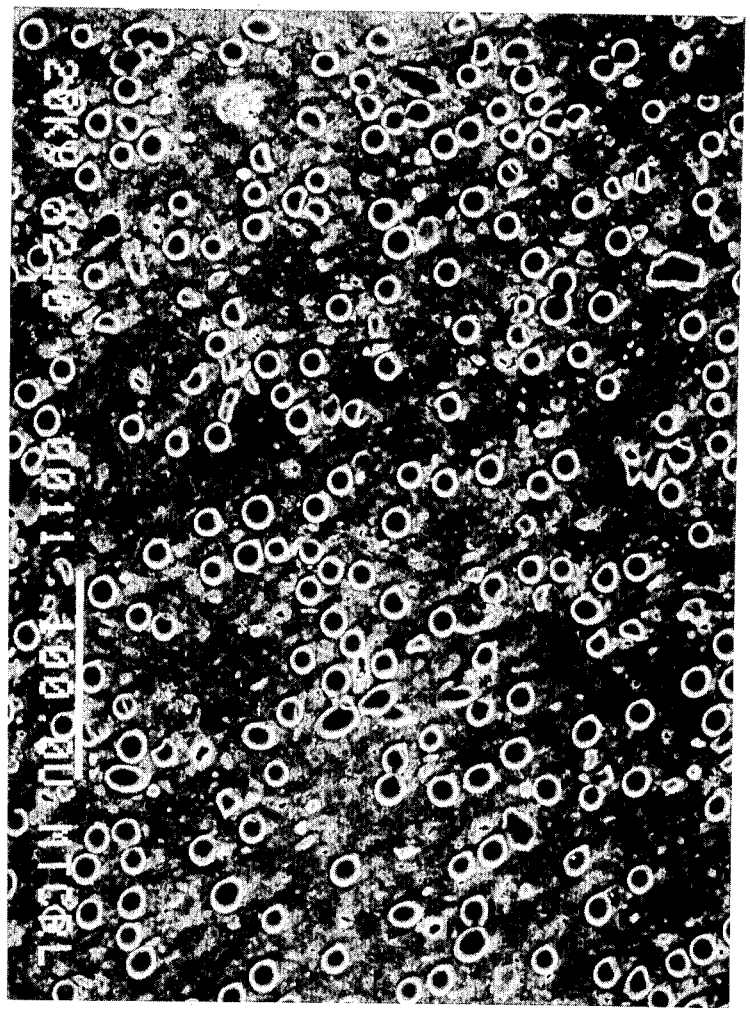
Figure 3:
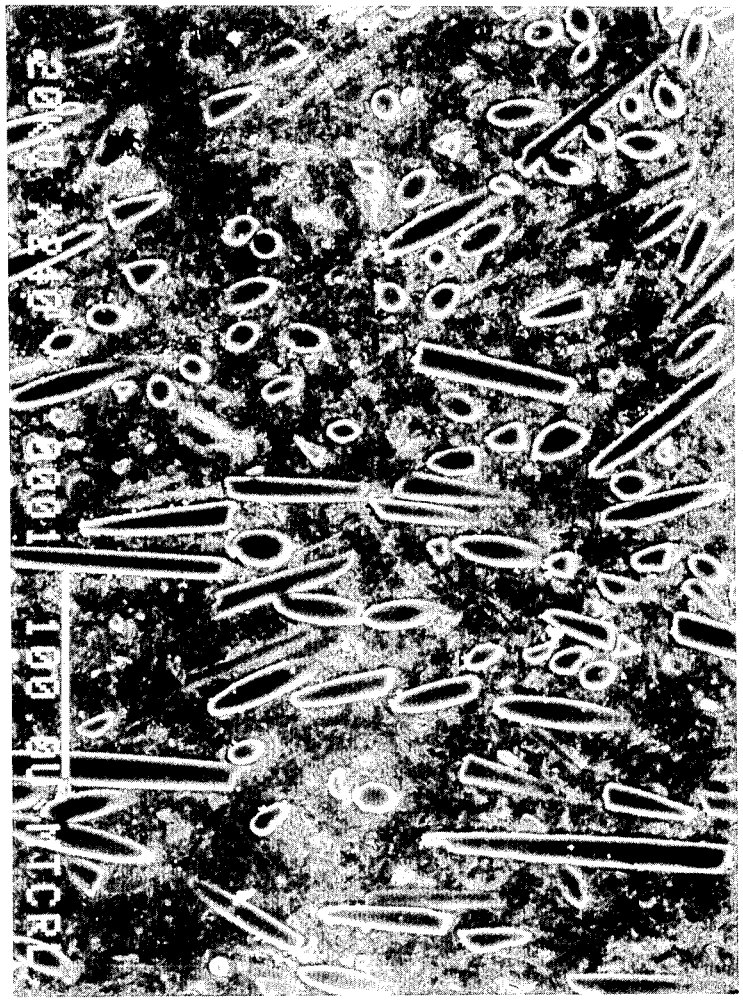
FIGS. 3 and 4 are electron micrographs showing also in longitudinal and transversal sections a phenolic resin pipe produced by the method of the present invention.
Figure 4:

FIGS. 1 and 2 are electron micrographs showing the shape of fibers in two sections of a phenolic resin pipe produced by the conventional extrusion molding method, one section being taken in the direction of extrusion, and the other taken normal to that direction. FIGS. 3 and 4 are electron micrographs showing the shape of fibers in two sections of a phenolic resin pipe produced by the method of the present invention, one section being taken in the direction of extrusion, and the other taken nornmal to that direction. As shown in FIG. 2, almost all fibers as seen in the direction normal to the direction of extrusion have a circular profile, indicating the high degree of fiber orientation in that normal direction. On the other hand, as shown in FIGS. 3 and 4, the fibers in the phenolic resin pipe produced by the present invention are generally oriented randomly. Because of this random orientation of the fibers, the ratio of the compressive strength in the direction normal to the pipe axis to the compressive strength in the axial direction can be controlled to be within 0.4 and 1.5, thereby increasing the utility of the pipe.

Illustrative thermosetting resins that can be extruded by the method of the present invention include phenolic resins, melamine resins, urea resins, unsaturated polyester resins, epoxy resin, silicone resins, allyl resins, xylene resins and aniline resins. The method of the present invention is particularly suitable for the molding of phenolic, epoxy and melamine resins.

These thermosetting resins may incorporate conventional fillers such as silica powder, calcium carbonate, talc and alumina. For the purpose of providing a molded article having improved strength, particularly high compressive strength, the thermosetting resins may also incorporate organic or inorganic reinforcing fibrous materials such as wood flour, cotton, nylon fibers, vinylon fibers, glass fibers, carbon fibers and metal fibers. These reinforcing fibrous materials may be in such a great amount that the sum of the latter and the fillers listed above is in the range of 20 to 80 wt % of the final molded product. The resins may also incorporate other additives such as release agents, thickeners, colorants, dispersant, foaming agents, as well as polymerization initiators, curing accelerators and polymerization inhibitors. Other polymers such as thermoplastic resins may also be used as an agent to control the viscosity of the thermosetting resins during their setting phase.

The characteristic feature of the present invention resides in the construction of the front section of extruder, and what is most important is shaping the thermosetting resin with a screw having a smooth zone in its front section. A single-screw extruder is typically used, but a thin-screw extruder and a multi-screw extruder may also be used so long as the respective screws are combined to form a single front section.

Figure 5:
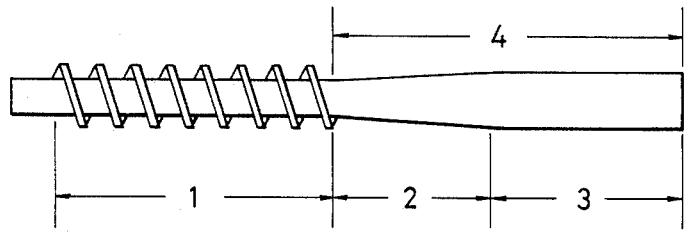
FIGS. 5 to 8 show embodiments of the screw used in the method of the present invention having a smooth zone in the front section.
Figure 6:
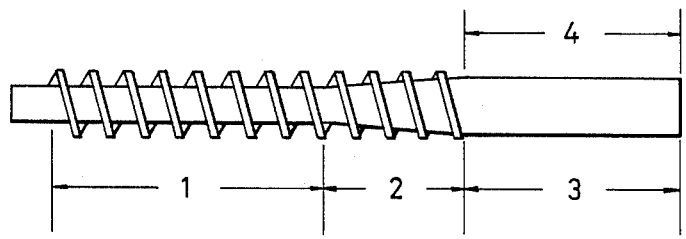
Figure 7:
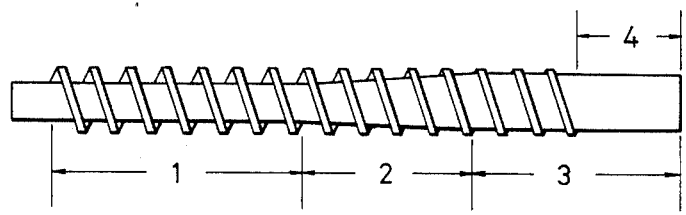

A typical example of the screw that can be used in the present invention is shown in FIG. 5, wherein a smooth zone 4 is provided in the front section of the screw. The screw has a feed zone 1, a compression zone 2, and a metering zone 3. The smooth zone 4 may start at the end of the feed zone as shown in FIG. 5, at the end of the compression zone as shown in FIG. 6, or in the intermediate section of the metering zone as shown in FIG. 7.

Figure 8:
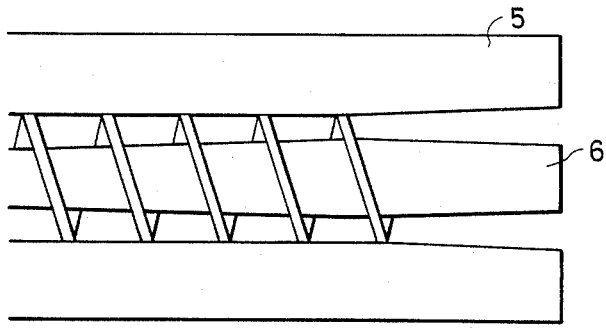

As shown in FIG. 8, the screw diameter in the smooth zone 4 and the inside diameter of the cylinder in the corresponding part may be increased or decreased, independently of the diameter of the screw bottom or inside diameter of the cylinder in the flighted section, according to the outside and inside diameters of the desired shaping.

The length-to-diameter (L/D) ratio of the special screw used in the present invention generally ranges from 7 to 40, preferably from 10 to 35, more preferably from 15 to 25. The compression ratio of the screw is generally in the range of from 1.0 to 5.0, preferably from 1.2 to 4.0 and more preferably from 1.5 to 3.0. The length of the smooth zone in the front section of the screw generally ranges from 1 to 15D, preferably from 2 to 10D, and more preferably from 2 to 7D.

If an ordinary full-flighted screw having no smooth zone in the front section is used in the method of the present invention, a helically shaped product is obtained instead of the desired pipe form. If the length of the smooth zone is less than 1D, a shaped product extruded from the cylinder deforms and continuous production of the desired shape is difficult. It the length of the smooth zone is greater than 15D, a high molding pressure results and may threaten the mechanical integrity of the extruder.

The compression ratio of the screw and the length of the smooth zone are variously limited by different combinations of the gap between the smooth zone of the screw and the corresponding part of the cylinder (i.e., the wall thickness of the molded particle), the extrusion rate, and the characteristics of the thermosetting resin feed. The higher the compression ratio of the screw and the longer the smooth zone, the higher the back pressure that is created by the screw, whereas the lower the compression ratio and the shorter the smooth zone, the lower the back pressure. If too high a back pressure is created, excessive kneading that occurs in the flighted section causes excessive heat generation and setting of the resin feed. Too low a back pressure is also undesirable since the compressive filling and kneading of the feed becomes insufficient. An adequate back pressure is necessary for achieving the compressive filling and thorough kneading of the feed. In other words, the compression ratio of the screw and the length of the smooth zone must be appropriate in order to ensure consistent extrusion and produce articles of good quality. The larger (smaller) the gap between the smooth zone of the screw and the corresponding part of the cylinder, the lower (higher) the extrusion rate, the smaller (larger) the viscosity of the resin feed, and the faster (slower) its setting reaction speed, the higher (lower) the compression ratio of the screw and the longer (shorter) the smooth zone must be.

As mentioned before, the screw diameter of the smooth zone 4 and the inside diameter of the corresponding section of the cylinder 5 can be increased or decreased according to the ouside and inside diameters of the final profile. Even if the screw diameter and the inside diameter of the cylinder are substantially equal to the inside and outside diameter of the molding, all or part of the surface of the metering zone (including the smooth zone) of the screw and the inner surface of the corresponding section of the cylinder may be provided with an inclination with respect to the axial direction of the screw. The inclination generally ranges from 1/1000 to 30/1000, preferably from 1/1000 to 10/1000.

The inclination provided with respect to the axial direction of the screw either reduces the frictional resistance between the resin and the metering zone of the screw or the corresponding part of cylinder, or provides the resin with increased compression so that the resin strongly adhere to each other. If the screw is tapered toward the front end, the frictional resistance between the screw and resin is decreased and application of excessive pressure to the molten resin can be avoided. No such effect is obtained if the taper is less than 1/1000. A taper greater than 30/1000 is not necessary since its application is limited to the case where the screw contacts the resin for a very short distance. If the screw is flared toward the front end, the resin is given an increased compression and the resin strongly adhere to each other. However, if the entire part of the metering zone is flared at an inclination greater than 30/1000, excessive compression occurs and an undesirably great pressure is applied to the resin. Flaring a part of the metering zone at an inclination greater than 30/1000 is also considered to be a modification of the compression zone and hence should be avoided.

Similar results can be obtained by providing the inner surface of the cylinder with an inclination with respect to the axial direction of the screw, in which case the inclination has the same limitations as described above.

An apparatus that can be used with advantage in order to implement the method of the present invention for extrusion-molding a thermosetting resin using the screw and cylinder shown above is illustrated in FIG. 9. This apparatus includes a screw consisting of a feed zone, a compression zone, a metering zone and a smooth zone; a cylinder portion having a heat control mechanism is areas corresponding to the feed, compression and metering zones; and a cylinder portion having a heat-supplying capability in an area corresponding to the smooth zone whose diameter is the same as or different from the diameter of the final screw in the metering zone. The reaction of setting the resin is promoted in the space defined by the smooth zone and the corresponding part of the cylinder and the resin is molded to such an extent that after being extruded from the cylinder, it is capable of retaining its own shape.

Figure 9:
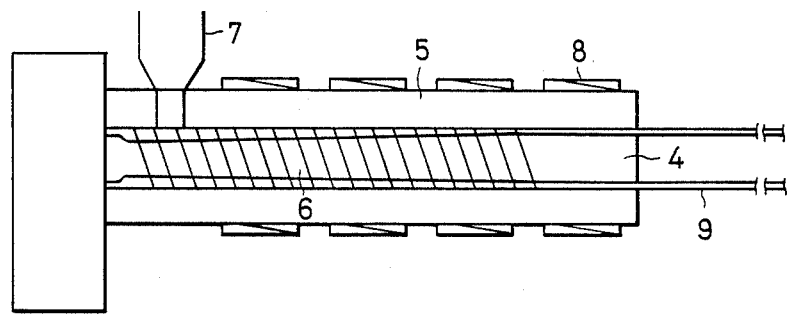
FIG. 9 shows a preferred embodiment of the apparatus used to implement the method of the present invention.

The operation of the apparatus shown in FIG. 9 is as follows: A thermosetting resin supplied to the cylinder 5 through a hopper 7 is melted by heaters 8 and is pushed in a helical form toward the smooth zone 4. The frictional resistance between the screw and cylinder, combined with the decreasing depth of the flight lands, causes the molten resin to firmly adhere to each other. As the molten resin is transferred through the smooth zone, it is worked up to such an extent that after being extruded from the cylinder it is capable of retaining its own shape. Having such firmness in structure, the resin is extruded from the cylinder in the form of a continuous pipe 9.

The internal construction of the extruder that is used in the present invention may incorporate various modifications, such as an air vent or a special kneading mechanism provided in the area extending from the feed zone to the metering zone.

In practicing the method of the present invention, the temperature settings of the respective sections of the extruder may vary with different combinations of the characteristics of the resin feed, the compression ratio of the screw, the clearance between the smooth zone of the screw and the corresponding part of the cylinder, the length of the smooth zone and the extrusion rate. The parts of the cylinder which correspond to the compression, metering and smooth zones of the screw are usually set at temperatures in the range of 50° to 200° C., preferably from 60° to 150° C. If temperatures lower than 50° C. are used, the resin does not set sufficiently strongly to provide a molding of good quality. On the other hand, temperatures higher than 200° C. are not necessary since most of the thermosetting resins that are shaped by extrusion molding can be set sufficiently strongly at temperatures up to 200° C.

Various advantages can be obtained by using the method and apparatus of the present invention under properly selected molding temperatures. All of the pipes that are molded from thermosetting resins by the conventional techniques shown in Japanese Patent Applications (OPI) Nos. 146860/79 and 128521/82 have low strength in the circumferential direction and are vulnerable to pressure applied either inside or outside the pipe. Furthermore, these pipes easily crack in the axial direction upon impact stress. This is probably because the resin and the fibrous filler are oriented in the direction of extrusion, or the axial direction of the pipe. Stated more specifically, in the conventional extrusion methods, the molten resin is molded and set as it is pushed through channels in the mold cavity, and throughout this stage, the resin moves only in the direction of extrusion, or the axial direction of the pipe, causing the resin and fibrous filler to be oriented in that direction.

On the other hand, in the method of the present invention, the resin travelling from the feed zone to the metering zone is subjected to a shear stress acting in a direction generally parallel to the screw channels. Thus the resin or fibrous filler is not oriented in any specific direction with respect to the direction of pipe extrusion. Furthermore, such a randomly oriented resin passes through the setting reaction after is is transferred to the smooth zone. As a result, the resin and the fibrous filler, particularly in the surface layer of the pipe wall, are oriented in a manner balanced between the axial and circumferential directions of the pipe. This is the reason why the pipe produced by the present invention has a good balance in compressive strength between its axial direction and the direction normal to that direction.

As will be shown later in this specification, five samples of pipes were extruded by the method of the present invention and their compressive strength in the direction normal to the pipe axis (A), the compressive strength in the axial direction (B), the values of A/B, and the results of the hydraulic pressure test conducted with these pipes are shown in Table 2 together with the relevant data for a conventional pipe. As one can easily see from this table, the conventional pipe had an A/B ratio of only 0.37 and developed longitudinal crack. However, all samples of the present invention had A/B ratios between 0.4 and 1.5 and satisfactorily withstood internal hydraulic pressure without developing a longitudinal crack.

Empirical data shows that pipes having A/B ratios smaller than 0.4 easily develop a longitudinal crack upon impact stress or application of pressure either within or outside the pipes, and the resulting crack runs a long distance in the axial direction. On the other hand, pipes having A/B ratios higher than 1.5 will easily break since they are weak in the direction normal to the pipe axis.

In the conventional extrusion methods, thermosetting resin heated to a molten state in the cylinder is introduced into the mold cavity through an adapter and given the final shape in that cavity. The flow of the resin is reduced in diameter by the adapter and reexpanded around the mandrel fixed to the spider. Because of this complex fluctuation in the flow channel of the resin, stagnation easily occurs, causing a localized setting reaction, or slightest change in pressure or temperature will induce sudden occurrence of the setting reaction. In order to prevent resin stagnation and ensure smooth extrusion of the resin by overcoming the drag caused by the complex channels, a high extrusion pressure must be provided by a special extruder. In spite of this, the conventional techniques cannot achieve an extrusion rate higher than 30 cm/min, and are unable to provide a pipe having a high degree of roundness and a uniform distribution in wall thickness.

According to the extrusion method and apparatus of the present invention, the profile is defined between the smooth zone of the screw and the corresponding part of the cylinder functions as a mold cavity and the resin flows only through the clearance between cylinder and screw. Therefore, resin stagnation does not occur in any part of the apparatus and there is no possibility of localized setting reaction or a sudden setting reaction occurring due to pressure or temperature fluctuation.

As a further advantage, the screw used in the method of the present invention is open to the atmosphere at the front end and is capable of pressure boosting and application of back pressure along its entire length. Therefore, the two kinds of pressure cancel each other and the resultant force on the thrust bearing of the screw is essentially smaller than what is created in the conventional extrusion molding method using both a screw and a mold.

The smooth zone of the screw used in the present invention is equivalent to the mandrel within the mold cavity used in the conventional extrusion molding technique. Since this smooth zone rotates during extrusion of the resin, a relatively small frictional resistance is created between the set resin and the metallic parts and the extrusion pressure necessary for implementing the present invention is equal to the value that can be provided by the conventional screw-type extruder. Therefore, the apparatus of the present invention can easily provide an extrusion rate of as high as 80 cm/min.

The pipe extruded by the method of the present invention may be subjected to post-setting as required. This post-setting is completed by proper heat treatment. However, as will be understood from the foregoing description, by properly selecting the molding conditions according to the present invention, the thermosetting resin extruded from the cylinder has already been set and molded to such an extent that it is capable of retaining its own shape without causing any deformation such as warpage, bending and swelling. Furthermore, the outside and inside diameters of the extruded pipe are respectively determined by the inside diameter of the front end of the cylinder and the outside diameter of the front end of the smooth zone of the screw. This feature, coupled with the simple configuration of the channels of the resin flow, is beneficial to the production of an extruded pipe having a high degree of roundness and uniform distribution of wall thickness. The thermosetting resin pipe provided by the method of the present invention has a good balance between its compressive strength in the axial direction and its compressive strength in the direction normal to the pipe axis. Therefore, the pipe has a high resistance to compressive and flexural stresses and finds extensive utility in flame-retardant and heat-resistant materials having high commercial value as electrical, construction or civil engineering materials.

The thermosetting resin pipe extruded by the present invention is particularly useful as a fluid transfer pipe or a protective pipe. Conventionally, liquid substances such as water and oil or gases such as air are transported through metal pipes or thermoplastic pipes such as polyvinylchlorid pipes. Metal pipes are strong but they are heavy, less convenient to lay and are easily attacked by corrosion. They have a high resistance to heat and flame, but their heat-insulating property is quite low, so that in case of fire, heat is rapidly transmitted to the fluid flowing through the pipe or the support or other associated elements of the pipe, thereby increasing the chance of fire spreading. Thermoplastic pipes are lightweight, have corrosion resistance and are inexpensive. However, as is well known, the thermoplastics are very poor in resistance to heat and flame.

A fluid transfer pipe extruded from the thermosetting resins by the present invention is highly resistant not only to heat but also to oils (e.g., fuel oil, gasoline and kerosene), organic solvents (e.g., alcohol, ketone, esters and aromatic hydrocarbons), acids and alkalis. In particular, pipes extruded from phenolic, melamine or xylene resins have excellent flame-retarding properties in that a flame that catches them extinguishes by itself, and that even if they are exposed to a flame, no dropping occurs, their original shape is substantially retained and no toxic gas is emitted.

The thermosetting resin pipes extruded by the present invention can be used to convey liquids (e.g., cold or hot water) to or from residences, office buildings, factories or hot spas (e.g., plumbing in baths, boilers, coolers and solar systems, as well as drain pipes in general), to fuel or remove fuel from factories, vehicles, vessels and airplanes, as well as convey chemicals. These pipes can also be used to convey gases to or from or to ventilate residences, office buildings and factories (e.g., supply and exhaust pipes for gas ranges, stoves and internal combustion engines, as well as general supply, ventilation and exhaust pipes), and to convey inert gases (e.g., nitrogen, argon and helium) to chemical plants.

Electric wires installed in residences, office buildings and factories electrical wiring in computers and office automation equipment, as well as piping for conveying fluids to and from chemical plants are also conventionally protected by metal or thermoplastic conduit pipes. However, these pipes have defects inherent in metals and thermoplastics. Again, these defects are absent from the thermosetting resin pipe extruded by the present invention, which has high resistance to corrosion, chemicals and heat and hence can be effectively used as a protective conduit. Particularly good results are obtained by using the thermosetting resin pipe of the present invention as a protector for pipes penetrating through the walls of constructions such as residences and office buildings; in case of fire, the thermosetting resin pipe does not burn and prevents spreading of fire by forming an insulating barrier against its heat.

The present invention will hereunder described in greater detail by reference to working examples and reference examples. It should be understood however that the scope of the invention is by no means limited to the working examples shown below.

EXAMPLE 1

An extruder having a hopper and a cylinder (D: 40 mm$\phi$, L/D: 24) equipped with a water-cooling jacket 2D long measured from the bottom of the hopper was used in this Example. The cylinder was also equipped with four electric heaters (2 kW) in the respective sections of 3D–10D, 11D–16D, 17D–20D and 21D–24D. The cylinder contained a screw having a feed zone of 5D, a compression zone of 12D, as well as metering and smooth zones having the specifications listed in Table 1 (Run Nos. 11 to 14). Using this extruding equipment, pipes were extruded from a phenolic resin ("Nikkalite 950 J" of The Nippon Synthetic Chemical Industry Co., Ltd. of Japan) containing a substantial amount of fillers, and organic and inorganic reinforcing fibrous materials, while the screw was rotating at 27 rpm. The cylinder consisted of the following five sections: $C_1$ (0–2D), $C_2$ (3D–10D), $C_3$ (11D–16D), $C_4$ (17D–20D) and $C_5$ (21D–24D). The $C_1$ zone was water-cooled, and the other four zones were respectively heated at 60° C., 90° C., 110° C. and 120° C.

Figure 10:
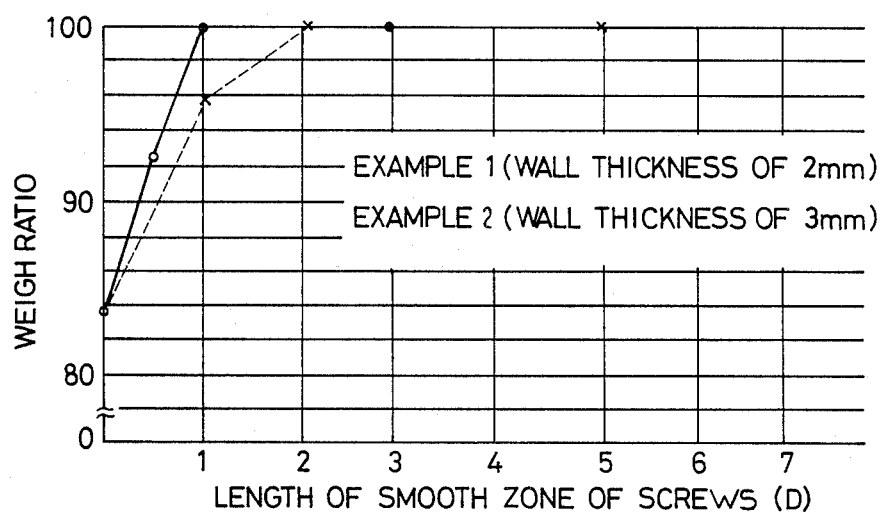
FIG. 10 is a graph showing the weight ratio of the molded articles produced in Examples 1 and 2 plotted against the length of the smooth zone of each of the screws.

The characteristics of the moldings are shown in Table 1 and FIG. 10. The values in the column "weight ratio" represent the weights of the respective profiles as against the weight of the good pipe of Run No. 14 which is taken as 100. The shapings obtained in Run Nos. 11 and 12 had small weight ratios, and as shown in the column "Remarks", they were unsuitable for use as pipes.

Table 1 and FIG. 10 show that in order to produce a good pipe having a wall thickness of 2 mm from the fillers and organic and inorganic reinforcing fibrous materials filled phenolic resin under the temperature conditions used in Example 1, the smooth zone in the front section of the screw must have a length of at least 1D.

EXAMPLE 2

An extruder with a cylinder having the specifications shown in Example 1 was used. The cylinder contained a screw having a feed zone of 5D, a compression zone of 12D, as well as metering and smooth zones having the specifications listed in Table 1 (Run Nos. 21 to 26). Using this extruding equipment, pipes were extruded from the same resin as used in Example 1, while the screw was rotating at 27 rpm. The cylinder consisted of the following five sections: $C_1$ (0–2D), $C_2$ (3D–10D), $C_3$ (11D–16D), $C_4$ (17D–20D) and $C_5$ (21D–24D). The $C_1$ zone was water-cooled, and the other four zones were respectively heated at 60° C., 90° C., 110° C. and 120° C.

The characteristics of the moldings are shown in Table 1 and FIG. 10. The values in the column "weight ratio" represent the weights of the respective profiles as against the weight of the pipe of Run No. 24 which is taken as 100. Table 1 and FIG. 10 show that in order to produce a good pipe having a wall thickness of 3 mm from the fillers and organic and inorganic reinforcing fibrous materials filled phenolic resin under the temperature conditions used in Example 2, the smooth zone in the front section of the screw must have a length of at least 2D.

EXAMPLE 3

An extruder having a cylinder diameter (D) of 40 mm and an L/D ratio of 24 was used. The cylinder contained a screw (compression ratio: 2.0) having a smooth zone with a diameter of 34 mm and a length of 120 mm (3D) which was in the front section extending from the metering zone with a screw bottom diameter of 34 mm. Using this extruding equipment, piping was extruded from a melamine resin ("ON-600" of Otalite Co., Ltd. of Japan) at 25 rpm with the cylinder having a thermal gradient ranging from 60° C. to 135° C. Continuous piping having an outside diameter of 40 mm and a wall thickness of 3 mm was extruded at an output of 15.6 kg/hr and an extrusion rate of 50.7 cm/min. The piping had an out of roundness of not greater than 0.02, an unevenness in wall thickness also not greater than 0.02, and a smooth surface gloss. The piping could be heated at 170° C. for 4 hours without causing any deformation or swelling. The acetone extraction of the piping was not more than 1%.

EXAMPLE 4

An extruder having a cylinder diameter (D) of 40 mm and an L/D ratio of 24 was used. The cylinder contained a screw having flights only in the feed zone and included a compression zone 40 mm long (1D) and a smooth zone 34 mm in diameter and 160 mm long (4D). Using this extruding equipment, piping was extruded from a phenolic resin ("Nikkalite 950-J" of The Nippon Synthetic Chemical Industry Co., Ltd.) at 25 rpm, with the cylinder having a heat gradient ranging from 60° to 120° C. Continuous piping having an outside diameter of 40 mm and a wall thickness of 3 mm was extruded at an output of 15.0 kg/hr and an extrusion rate of 47.8 cm/min. This piping had low out of roundness (0.02) and maximum unevenness in wall thickness (−0.02) and provided a smooth surface gloss. It could be heated at 170° C. for 4 hours without causing any deformation or swelling. The acetone extraction of the piping was not more than 1%.

TABLE 1

| Run No. | Screw compression ratio | Screw metering zone bottom dia. (mm) | Screw metering zone length | Screw smooth zone dia. (mm) | Screw smooth zone length | Output (kg/hr) | Extrusion rate (cm/min) | Weight ratio (*1) | Percent acetone extraction (*2) | Out of roundness (*3) | Unevenness of wall thickness (*4) | Heat treatment (*5) | Remarks |
|---|---|---|---|---|---|---|---|---|---|---|---|---|---|
| Ex. 1 | | | | | | | | | | | | | |
| 11 | 2.0 | 34 | 7D | — | 0 | 18.1 | — | 83.6 | — | — | — | — | The extrudate was helical and not a pipe. |
| 12 | 2.0 | 34 | 6.5D | 36 | 0.5D | 18.0 | — | 92.4 | — | — | — | — | The extrudate was a pipe, but because of insufficient cohesion between resin fibers, the pipe had many cracks and was unsuitable for practical use. |
| 13 | 2.0 | 34 | 6D | 36 | 1D | 17.7 | 82.4 | 99.8 | 1> | 0.02> | 0.02> | No deformation or swelling occurred. | Pipe having a smooth surface gloss was continuously extruded. |
| 14 | 2.0 | 34 | 4D | 36 | 3D | 17.2 | 80.1 | 100 | 1> | 0.02> | 0.02> | No deformation or swelling occurred. | Pipe having a smooth surface gloss was continuously extruded. |
| Ex. 2 | | | | | | | | | | | | | |
| 21 | 2.0 | 34 | 7D | — | 0 | 18.1 | — | 83.6 | — | — | — | — | The extrudate was helical and not a pipe. |
| 22 | 2.0 | 34 | 6D | 34 | 1D | 17.9 | — | 95.8 | — | — | — | — | The extrudate was a pipe, but because of insufficient cohesion between resin fibers, the pipe had many cracks and was unsuitable for practical use. |
| 23 | 2.0 | 34 | 5D | 34 | 2D | 17.8 | 56.7 | 100.1 | 1> | 0.02> | 0.02> | No deformation or swelling occurred. | Pipe having a smooth surface gloss was continuously extruded. |
| 24 | 2.0 | 34 | 4D | 34 | 3D | 17.5 | 55.8 | 100 | 1> | 0.02> | 0.02> | No deformation or swelling occurred. | Pipe having a smooth surface gloss was continuously extruded. |
| 25 | 2.0 | 34 | 2D | 34 | 5D | 16.5 | 52.6 | 100 | 1> | 0.02> | 0.02> | No deformation or swelling occurred. | Pipe having a smooth surface gloss was continuously extruded. |
| 26 | — | — | 0 | 34 | 7D | 15.1 | 48.1 | 100.2 | 1> | 0.02> | 0.02> | No deformation or swelling occurred. | Pipe having a smooth surface gloss was continuously extruded. |

(*1) Weight ratio: The relative weight of each shaping per meter as against the weight per meter of Run No. 14 (Example 1) and Run No. 24 (Example 2) which is taken as 100.
(*2) Percent acetone extraction: The pipe extruded was ground to particles of about 100 mesh, and 5 g of the powder was extracted with 200 cc of acetone in a Soxhlet extractor for 6 hours. The amount of the extract as against the initial powder is taken as percent acetone extraction.
(*3) Out of roundness: The difference (1) between the maximum and minimum outside diameters of the pipe extruded was measured with an outside micrometer caliper. The difference (2) between the maximum and minimum inside diameters of the same pipe was measured with an inside micrometer caliper. Of the two differences, the greater one was taken as an index for the out of roundness of the pipe.
(*4) Unevenness of wall thickness: Measured by the method shown JIS K 6911.
(*5) Heat treatment: The pipe extruded was heated at 170° C. for 4 hours.

EXAMPLE 5

An extruder having a cylinder diameter (D) of 30 mm and an L/D ratio of 22 was used. The cylinder contained a screw (compression ratio: 2.0) having a smooth zone with a diameter of 26 mm and a length of 105 mm (3.5D) which was in the front section extending from the metering zone with a screw bottom diameter of 26 mm. Using this extruding equipment, piping was extruded from a phenolic resin ("Rogers RX-6684" of Nippon Oil Seal Industry Co., Ltd. of Japan), while the screw was rotating at 35 rpm. The cylinder consisted of the following four sections: $C_1$ (0–2D), $C_2$ (3D–10D), $C_3$ (11D–18D) and $C_4$ (19D–22D). The $C_1$ zone was water-cooled, and the other three zones were respectively heated at 80° C., 100° C. and 120° C. Continuous piping having an outside diameter of 30 mm and a wall thickness of 2.0 mm was obtained.

EXAMPLE 6

Extruding equipment the same as used in Example 5 was fed with a phenolic resin ("Nikkalite 950-J" of The Nippon Synthetic Chemical Industry Co., Ltd.) to extrude piping 35 rpm. The $C_1$ zone of the cylinder was water cooled, and $C_2$, $C_3$ and $C_4$ were respectively heated at 85° C., 115° C. and 125° C. The piping had an outside diameter of 30 mm and a wall thickness of 2.0 mm.

Evaluation of pipe Strength:

Each of the pipes extruded in Examples 5 to 9 was checked for compressive strength in the direction normal to its axis, the compressive strength in its axial direction, as well as the ratio of the first to second compressive strengths. The pipes were also subjected to a hydraulic pressure test. The results are shown in Table 2. The compressive strength in the axial direction of the pipe was measured by the method specified in JIS (Japanese Industrial Standard) K 6911, 5. 19-5 (Compressive Strength Test) and is represented by the load applied until the pipe burst (or cracked). The compressive strength in the direction normal to the pipe axis was measured by the method specified in JIS K 6741, 5-6 (Flattening Test) and is indicated by the load applied until the pipe burst.

TABLE 2

| | Resin | | | | | |
|---|---|---|---|---|---|---|
| Factor | Example 5 phenolic resin (RX-6684) | Example 6 phenolic resin (950-J) | Example 7 phenolic resin (PM-795J) | Example 8 melamine resin (ON-600) | Example 9 epoxy resin (J-1060F) | Comparative Example commercial phenolic resin pipe (*1) |
| compressive strength | | | | | | |
| normal to pipe axis (A) kg/mm$^2$ | 8.8 | 17.4 | 19.9 | 15.1 | 18.3 | 7.0 |
| axial (B) kg/mm$^2$ | 21.0 | 19.7 | 13.4 | 14.3 | 16.3 | 18.8 |
| A/B | 0.42 | 0.88 | 1.48 | 1.06 | 1.14 | 0.37 |
| hydraulic test (*2) | | | | | | |
| burst pressure kg/cm | 70~75 | 90~105 | 90~100 | 80~95 | 85~100 | 40~50 |
| directivity of cracks | cracked randomly | cracked randomly | cracked randomly | cracked randomly | cracked randomly | cracked longitudinally |

(*1) Trade name "E" (abbrv.), manufactured by T Kogyo, OD = 30 mm, wall thickness = 2.5 mm
(*2) According to JIS K 6743, the hydraulic pressure was increased until the pipe burst.

Nippon Synthetic Chemical Industry Co., Ltd.) to extrude piping at 35 rpm. The $C_1$ zone of the cylinder was water cooled, and the other three zones, $C_2$, $C_3$ and $C_4$ were respectively heated at 80° C., 110° C. and 120° C. The piping had an outside diameter of 30 mm and a wall thickness of 2.0 mm.

EXAMPLE 7

Extruding equipment the same as used in Example 5 was fed with a phenolic resin ("PM-795J" of Sumitomo Bakelite Co., Ltd. of Japan) to extrude piping at 35 rpm. The $C_1$ zone of the cylinder was water-cooled, and $C_2$, $C_3$ and $C_4$ were respectively heated to 80° C., 105° C. and 120° C. The piping had an outside diameter of 30 mm and a wall thickness of 2.0 mm.

EXAMPLE 8

Extruding equipment the same as used in Example 5 was fed with a melamine resin ("ON-600" of Otalite Co., Ltd.), while the screw was rotating at 35 rpm to extrude continuous piping. The $C_1$ zone of the cylinder was water-cooled, and $C_2$, $C_3$ and $C_4$ zones were respectively heated at 85° C., 115° C. and 130° C. The piping had an outside diameter of 30 mm and a wall thickness of 2.0 mm.

EXAMPLE 9

Extruding equipment the same as used in Example 5 was fed with an epoxy resin ("Acmelite J-1060F" of

EXAMPLE 10

An extruder having a hopper and a cylinder (D: 40 mm$\phi$, L/D: 24) equipped with a water-cooling jacket 2D long measured from the bottom of the hopper was used in this Example. The cylinder was also equipped with four electric heaters (2 kW) in the respective sections of 3D–10D, 11D–16D, 17D–20D and 21D–24D. The cylinder contained a screw having a feed zone of 5D, a compression zone of 12D, as well as a smooth zone having a length of 160 mm (4D) which was in the front section extending from a metering zone having a screw bottom diameter of 35 mm. The screw had a compression ratio of 2,0, and a length of 120 mm (3D) in the front section of the smooth zone was tapered at an inclination of 5/1000. Using this extruding equipment, piping was extruded from a phenolic resin ("PM-634 J" of Sumitomo Bakelite Co., Ltd.) at 27 rpm. The cylinder consisted of the following five sections: $C_1$ (0–2D), $C_2$ (3D–10D), $C_3$ (11D–16D), $C_4$ (17D–20) and $C_5$ (21D–24D). The $C_1$ zone was water-cooled, and the other four zones were respectively heated at 60° C., 90° C., 110° C. and 120° C. The characteristics of the extruded piping were shown in Table 3.

REFERENCE EXAMPLE 1

An extruder with a cylinder having the specifications shown in Example 10 was used. The cylinder contained a screw (compression ratio: 2.0) having the feed zone of 5D, a compression zone of 12D and a smooth zone of with a diameter of 35 mm and a length of 160 mm (4D) which was in the front section extending from the metering zone with a screw bottom diameter of 35 mm. Using this extruding equipment, a phenolic resin ("PM-635 J") was extruded as in Example 10. The characteristics of the molding are shown in Table 3.

EXAMPLE 11

An extruder with a cylinder having the same specification as shown in Example 10 was used. The cylinder contained a screw (compression ratio: 1.5) having a feed zone of 5D, a compression zone of 12D and a smooth zone with a length of 120 mm (3D) which was in the front section extending from the metering zone having a screw bottom diameter of 33.4 mm. A length of 80 mm (2D) measured from the foremost end of the screw was straight but a length of another 80 mm measured from that zone was flared at an inclination of 10/1000. Using this extruding equipment, piping was extruded from a phenolic resin ("Nikkalite 950-J" of The Nippon Synthetic Chemical Industry Co., Ltd.) at 27 rpm. The cylinder consisted of the following five sections: $C_1$ (0–2D), $C_2$ (3D–10D), $C_3$ (11D–16D), $C_4$ (17D–20D) and $C_5$ (21D–24D). The $C_1$ zone was water-cooled, and the other four zones were respectively heated at 60° C., 90° C., 110° C. and 125° C. The characteristics of the piping extruded are shown in Table 3.

REFERENCE EXAMPLE 2

An extruder with a cylinder having the same specifications as shown in Example 10 was used. The cylinder contained a screw (compression ratio: 1.5) having a feed zone of 5D, a compression zone of 12D and a smooth zone with a diameter of 35 mm and a length of 120 mm (3D) which was in the front section extending from the metering zone having a screw bottom diameter of 35 mm. Using this extruding equipment, a phenolic resin ("Nikkalite 950-J") was extruded as in Example 11. The characteristics of the molding are shown in Table 3.

Evaluation of Extrudates:

Table 3 shows that even high-pressure resin which is inherently difficult to shape can be extruded with relative ease by using a screw having a metering zone tapered toward the front end. On the other hand, a dense product can be extruded from a low-pressure resin by using a screw having a metering zone flared toward the front end.

EXAMPLE 12

An extruder having a cylinder diameter (D) of 30 mm and an L/D ratio of 22 was used. The cylinder contained a screw (compression ratio: 2.3) having a smooth zone with a diameter of 25 mm and a length of 120 mm (4D) which was in the front section extending from the metering zone with a screw bottom diameter of 25 mm. Using extruding equipment, piping was extruded from a phenolic resin ("Rogers RX-6684" of Nippon Oil Seal Industry Co., Ltd.) at 35 rpm. The cylinder consisted of the following four sections: $C_1$ (0–2D), $C_2$ (3D–10D), $C_3$ (11D–18D) and $C_4$ (19D–22D). The $C_1$ zone was water-cooled, and the other three zones were respectively heated at 80° C., 100° C. and 120° C. Piping having an outside diameter of 30 mm and a wall thickness of 2.5 mm could be obtained.

EXAMPLE 13

Extruding equipment the same as used in Example 12 was fed with a phenolic resin ("CN-4610" of Matsushita Electric Works, Ltd. of Japan) to extrude piping at 35 rpm. The $C_1$ zone of the cylinder was water-cooled, and the other three zones, $C_2$, $C_3$ and $C_4$ were respectively heated at 80° C., 110° C. and 120° C. The piping had an outside diameter of 30 mm and a wall thickness of 2.5 mm.

EXAMPLE 14

Extruding equipment the same as used in Example 12 was fed with a phenolic resin ("PM-795J" of Sumitomo Bakelite Co., Ltd.) to extrude piping at 35 rpm. The $C_1$ zone of the cylinder was water-cooled, and the other three zones, $C_2$, $C_3$ and $C_4$ were respectively heated at 80° C., 100° C. and 120° C. The piping had an outside diameter of 30 mm and a wall thickness of 2.5 mm.

EXAMPLE 15

Extruding equipment the same as used in Example 12 was fed with a melamine-phenolic resin ("ME-A" of Matsushita Electric works, Ltd.) to extrude piping at 35 rpm. The $C_1$ zone of the cylinder was water-cooled, and the other three zones, $C_2$, $C_3$ and $C_4$ were respectively heated at 85° C., 120° C. and 130° C. The piping had an outside diameter of 30 mm and a wall thickness of 2.5 mm.

Evaluation of Extrudates:

The characteristics of the pipes produced in Examples 12 to 15 are shown in Tables 4 and 5. The thermosetting resin pipes extruded by the method of the present invention had a good balance in compressive strength between the axial direction and the direction normal to the pipe axis, and hence were capable of

TABLE 3

| Factor | Example 10 | Reference Example 1 | Example 11 | Reference Example 2 |
|---|---|---|---|---|
| resin pressure (kg/cm²) (*1) | 240 | >350 | 210 | 140 |
| extrusion performance | extruded continuously | continuous extrusion impossible | extruded continuously | extruded continuously |
| hydraulic test | | | | |
| burst pressure (kg/cm²) | 90~100 | — | 90~110 | 45~50 |
| directivity of cracks | cracked randomly | — | cracked randomly | just before bursting, pinholes formed and water gushed out. |

(*1) Measured at the first pitch of the metering zone as measured from the hopper.

withstanding a significant amount of internal pressure. Furthermore, these pipes exhibited satisfactory resistance to heat, fire and chemicals, as well as sufficient protection against flame.

TABLE 4

|  | Examples | | | | Comparative Example commercial phenolic pipe (*1) |
| --- | --- | --- | --- | --- | --- |
| Resin | 12 phenolic (RX-6684) | 13 phenolic (CN-4610) | 14 phenolic (PM-795J) | 15 melamine-phenolic (ME-A) | |
| compressive strength | | | | | |
| normal to pipe axis (A) (kg/mm) | 9.8 | 14.9 | 19.4 | 13.8 | 7.0 |
| axial (B) (kg/mm) | 21.6 | 13.7 | 13.1 | 16.0 | 18.8 |
| A/B | 0.45 | 1.09 | 1.48 | 0.86 | 0.37 |
| hydraulic test (*2) | | | | | |
| burst pressure (kg/cm$^2$) | 70~85 | 100~110 | 105~120 | 90~110 | 40~50 |
| directivity of cracks | cracked randomly | cracked randomly | cracked randomly | cracked randomly | cracked longitudinally |

TABLE 5

| | Examples | | | | | Comparative Examples | | |
|---|---|---|---|---|---|---|---|---|
| | 12 | 13 | 14 | 15 | 1 | 2 | 3 | |
| pipe | phenolic resin pipe | phenolic resin pipe | phenolic resin pipe | melamine-phenolic resin pipe | commercial phenolic resin pipe (*1) | rigid PVC pipe (nominal dia. = 30 mm) | cast iron pipe (nominal dia. = 50 mm, wall thickness = 4.5 mm) | |
| Heat resistance (*3) | unchanged | unchanged | unchanged | unchanged | unchanged | deformed | unchanged | |
| Fire resistance (*4) | The area exposed to flame charred but the overall shape was retained. | The area exposed to flame charred but the overall shape was retained. | The area exposed to flame charred but the overall shape was retained. | The area exposed to flame charred but the overall shape was retained. | The area exposed to flame charred but the overall shape was retained. | The area exposed to flame melted to form a hole, and nearby area scorched to deform the pipe. | The area exposed to flame became red-hot but the overall shape was retained. | |
| Protection against flame (*5) | The area exposed to flame charred but electric current was still flowing. | The area exposed to flame charred but electric current was still flowing. | The area exposed to flame charred but electric current was still flowing. | The area exposed to flame charred but electric current was still flowing. | The area exposed to flame charred but electric current was still flowing. | The area exposed to flame melted to form a hole; and the electric wires burnt. | The area exposed to flame became red-hot and the insulation coat on the wires melted to cause shorting. | |
| chemical resistance (*6) | | | | | | | | |
| methanol | unchanged | unchanged | unchanged | unchanged | unchanged | unchanged | unchanged | |
| xylene | " | " | " | " | " | swelled | " | |
| gasoline | " | " | " | " | " | slightly swelled | " | |
| 5% HCl | " | " | " | " | " | unchanged | rusted | |
| 5% NaOH | " | " | " | " | " | " | " | |
| 5% NaCl (aq. sol.) | " | " | " | " | " | " | " | |
| hot water | " | " | " | " | " | deformed | " | |

(*1) See note 1 to Table 2.
(*2) See note 2 to Table 2.
(*3) A pipe 60 cm long was placed horizontally on two support rods 50 cm apart, and exposed to a heat of 180° C. for 2 hours.
(*4) A pipe 60 cm long was placed horizontally on two support rods 50 cm apart, and its center was contacted for 3 minutes by the tongue of a stable blue flame about 50 mm high issuing from a Bunsen burner positioned directly beneath the pipe.
(*5) A plurality of electric cords were squeezed into a pipe and secured to its inner wall. With an electric current flowing through the cords, the pipe was subjected to the same test as in (*4).
(*6) Samples of each pipe 5 cm long were immersed in hot water and various chemicals under the following conditions:
Hot water = 100° C. for 24 hours
Other chemicals = R.T. for 1 week

We claim:

1. A method of extrusion-molding a thermosetting resin comprising the following steps:

employing a screw-type extrusion-molding machine which comprises a screw having in sequence a feed zone, a compression zone, a metering zone, and a smooth zone, said smooth zone being in a front section of said screw, said machine further including a first cylinder portion having a heat control mechanism in areas respectively corresponding to the feed, compression, and metering zones, and a second cylinder portion having a heat-supplying capability in an area corresponding to the smooth zone, wherein said screw has a length to diameter ratio of 7 to 40, and a compression ratio of 1.0 to 5.0, a length of the smooth zone being in the range of 1D to 15D, wherein D is a diameter of the screw, wherein said employing step comprises the following steps:

heating the parts of the cylinder which correspond to the compression, metering, and smooth zones of the screw to a temperature in a range of 50° to 200° C.; and molding said resin in the smooth zone;

said method further comprising the step of thermosetting the resin in the smooth zone to such an extent that the resin after being extruded from the extrusion molding machine is capable of retaining its own shape, wherein said resin is selected from the group consisting of a phenolic resin, a melamine resin, and an epoxy resin.

2. A method according to claim 1, wherein the smooth zone has a length of 2 to 10D.

3. A method according to claim 2, wherein the smooth zone has a length of 2 to 7D.

4. A method according to claim 1, wherein said thermosetting resin has a filler incorporated therein.

5. A method according to claim 4, wherein the filler contains a fibrous filler.

6. A method according to claim 5, wherein the filler containing a fibrous filler is incorporated in an amount of 20 to 80 wt % of the thermosetting resin.

7. A method according to claim 5, wherein at least one of the thermosetting resin and the fibrous filler is oriented randomly.

8. A method according to claim 7, wherein the extruded thermosetting resin has the shape of a pipe having a strength such that the ratio of its compressive strength in a direction normal to a longitudinal axis of the pipe to its compressive strength along the longitudinal axis is between 0.4 and 1.5.

* * * * *